(12) United States Patent
Maddikeri et al.

(10) Patent No.: US 10,388,424 B2
(45) Date of Patent: Aug. 20, 2019

(54) POLY(ETHERIMIDE-SILOXANE)-AROMATIC POLYKETONE COMPOSITIONS AND ARTICLES MADE THEREFROM

(71) Applicant: SABIC GLOBAL TECHNOLOGIES B.V., Bergen op Zoom (NL)

(72) Inventors: Raghavendra Raj Maddikeri, Evansville, IN (US); Liang Shen, Shanghai (CN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 165 days.

(21) Appl. No.: 15/561,643

(22) PCT Filed: Mar. 29, 2016

(86) PCT No.: PCT/US2016/024727
§ 371 (c)(1),
(2) Date: Sep. 26, 2017

(87) PCT Pub. No.: WO2016/160814
PCT Pub. Date: Oct. 6, 2016

(65) Prior Publication Data
US 2018/0075942 A1    Mar. 15, 2018

Related U.S. Application Data

(60) Provisional application No. 62/140,530, filed on Mar. 31, 2015.

(51) Int. Cl.
| | |
|---|---|
| *H05K 3/30* | (2006.01) |
| *H01B 3/30* | (2006.01) |
| *C08L 83/10* | (2006.01) |
| *H01B 7/29* | (2006.01) |
| *H01B 7/295* | (2006.01) |
| *H01B 3/46* | (2006.01) |
| *C08L 67/00* | (2006.01) |
| *C08L 79/08* | (2006.01) |
| *C08L 83/12* | (2006.01) |
| *C08G 77/455* | (2006.01) |

(52) U.S. Cl.
CPC .............. *H01B 3/306* (2013.01); *C08L 67/00* (2013.01); *C08L 79/08* (2013.01); *C08L 83/10* (2013.01); *C08L 83/12* (2013.01); *H01B 3/307* (2013.01); *H01B 3/46* (2013.01); *H01B 7/292* (2013.01); *H01B 7/295* (2013.01); *C08G 77/455* (2013.01); *C08L 2203/202* (2013.01); *C08L 2207/04* (2013.01); *C08L 2666/78* (2013.01); *C08L 2666/84* (2013.01)

(58) Field of Classification Search
CPC ........ H01B 3/306; H01B 7/295; H01B 7/292; C08L 83/12; C08L 2666/84; C08L 2203/202
See application file for complete search history.

(56) References Cited

U.S. PATENT DOCUMENTS

| | | | |
|---|---|---|---|
| 4,690,997 A | 9/1987 | Cella et al. | |
| 5,660,932 A | 8/1997 | Durston | |
| 7,847,023 B2 | 12/2010 | Gallucci et al. | |
| 8,071,693 B2 | 12/2011 | Banerjee et al. | |
| 2009/0084574 A1* | 4/2009 | Balfour | C08J 3/28 174/110 SR |
| 2009/0234060 A1 | 9/2009 | Haralur et al. | |
| 2010/0139944 A1* | 6/2010 | Guo | C08L 71/12 174/110 SR |
| 2010/0147548 A1* | 6/2010 | Bhandari | C08L 71/00 174/110 SR |
| 2011/0266024 A1* | 11/2011 | Qiu | C08K 3/016 174/110 SR |
| 2012/0261163 A1* | 10/2012 | Tai | C08L 53/02 174/136 |

FOREIGN PATENT DOCUMENTS

| | | |
|---|---|---|
| WO | 2008112742 A1 | 9/2008 |
| WO | 2016137878 | 9/2016 |
| WO | 2016157082 | 10/2016 |
| WO | 2016157096 | 10/2016 |

OTHER PUBLICATIONS

International Search Report for International Application No. PCT/IB2016/051775; International Filing Date: Mar. 29, 2016; dated Jun. 8, 2016; 5 pages.
International Search Report for International Application No. PCT/IB2016/051804; International Filing Date: Mar. 30, 2017; dated May 30, 2016; 5 pages.
International Search Report for International Application No. PCT/US2016/024727; International Filing Date: Mar. 29, 2016; dated Jun. 6, 2016; 5 pages.
Written Opinion of the International Searching Authority for International Application No. PCT/IB2016/051775; International Filing Date: Mar. 29, 2016; dated Jun. 8, 2016; 6 pages.
Written Opinion of the International Searching Authority for International Application No. PCT/IB2016/051804; International Filing Date: Mar. 30, 2017; dated May 30, 2016; 6 pages.
Written Opinion of the International Searching Authority for International Application No. PCT/US2016/024727; International Filing Date: Mar. 29, 2016; dated Jun. 6, 2016; 6 pages.

* cited by examiner

*Primary Examiner* — Sherman Ng
(74) *Attorney, Agent, or Firm* — Cantor Colburn LLP

(57) ABSTRACT

An electrical wire includes a conductor wire and a covering disposed over the conductor wire. The covering includes a thermoplastic composition. The thermoplastic composition includes a blend of an aromatic polyketone and a poly (etherimide-siloxane) copolymer. Electrical wires having such coverings can be useful in providing articles including electrical wires for high-heat applications including railway vehicle, automobile, marine vehicle, aircraft, or data transmission components.

15 Claims, No Drawings

POLY(ETHERIMIDE-SILOXANE)-AROMATIC POLYKETONE COMPOSITIONS AND ARTICLES MADE THEREFROM

CROSS-REFERENCE TO RELATED APPLICATIONS

This application is a National Stage application of PCT/US2016/024727, filed Mar. 29, 2016, which claims the benefit of U.S. Provisional Application No. 62/140,530, filed Mar. 31, 2015, both of which are incorporated by reference herein in their entirety.

BACKGROUND

Poly(etherimide-siloxane) copolymers (also known as polysiloxane/polyimide block copolymers) have been explored as coatings for electrical wires due to their flame resistant properties and high temperature stability. These copolymers are attractive for applications of this type because the polyetherimide blocks impart desirable properties such as high temperature resistance, high strength, good wear resistance, good flame retardant properties, and low smoke density. The polysiloxane blocks contribute flexibility, good low-temperature properties, and temperature stability.

Aromatic polyketones such as polyaryletherketones are crystalline polymers valued due to their resistance to high temperatures, crystallizability, melt extrudability, and injection moldability, thereby making them versatile and useful in many applications. Crystallization of polymers is an important feature in polymer processing, because the structure developed during crystallization can affect the mechanical and physical properties of the polymer product. The crystallization of polymers under processing conditions is essential for optimizing the processing conditions to obtain a product with desired properties. Aromatic polyketones, such as polyaryletherketones frequently suffer from brittleness, e.g., poor toughness (low ductility), making them unsuitable for many applications.

There has been a long felt need to develop a composition that has high impact strength and low flexural modulus and high tensile elongation, specifically one that has a ductility exceeding that of aromatic polyketones yet retains the advantageous processing features. Polyaryletherketone blends have sought to solve this problem, but these blends have suffered from drawbacks such as insufficient ductility, delamination and the like.

Accordingly, there remains a need in the art for improved thermoplastic compositions having the desired combination of physical properties including low flammability, high temperature stability, low flexural modulus, high tensile elongation, high impact strength, and improved tear strength. Thermoplastic compositions having this combination of properties can be useful for applications including electrical wire coatings.

BRIEF DESCRIPTION

An article comprising an electrical wire is disclosed, wherein the electrical wire comprises a conductor wire; and a covering disposed over the conductor wire, wherein the covering is formed from a thermoplastic composition comprising, 5-75 weight percent aromatic polyketone; and 25-95 weight percent poly(etherimide-siloxane) copolymer having a siloxane content of more than 0 to less than 50 weight percent based on the total weight of the poly(etherimide-siloxane) copolymer; wherein the weight percent of each component is based on the total weight of the composition; and wherein the thermoplastic composition coating the conductor wire has one or more of the following properties: a tensile stress of greater than 30 MPa, determined according to UL-1581 after 24 hours at 23° C.; a tensile elongation of greater than 100%, determined according to UL-1581 after 24 hours at 23° C.; and achieves a pass rating in the single wire vertical flame propagation test conducted according to EN50265-2-1/IEC60332-1, as determined in the presence of the wire conductor.

The above described and other features are exemplified by the following detailed description.

DETAILED DESCRIPTION

Described herein are thermoplastic compositions comprising a poly(etherimide-siloxane) copolymer and an aromatic polyketone. The inventors hereof have unexpectedly discovered the combination of these two polymers produces a composition having desirable properties for high-heat wire coating applications. The blends can be particularly useful for the preparation of articles for various industries, including railway vehicle components, automobile components, marine vehicle components, aircraft components, or data transmission components.

The aromatic polyketone comprises repeating units of formula (1)

(1)

wherein Ar is independently at each occurrence a substituted or unsubstituted, monocyclic or polycyclic aromatic group having 6 to 30 carbons. Exemplary Ar groups include, but are not limited to, phenyl, tolyl, naphthyl, and biphenyl.

The aromatic polyketone can be a polyaryletherketone in which case it comprises repeating units of formula (1) and repeating units of formula (2)

(2)

wherein Ar is defined as above. In some embodiments the aromatic polyketone comprises a polyetherketone. Polyetherketone comprises repeating units of formula (3)

(3)

wherein Ar is defined as above and $Ar^1$ is independently at each occurrence a substituted or unsubstituted, monocyclic or polycyclic aromatic group having 6 to 30 carbons. Ar can be the same as or different from $Ar^1$. In some embodiments Ar and $Ar^1$ are phenyl groups.

In some embodiments the aromatic polyketone comprises a polyetheretherketone. Polyetheretherketone comprises repeating units of formula (4)

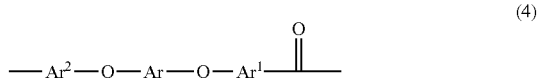

(4)

wherein Ar and Ar¹ are defined as above. Ar² is independently at each occurrence a substituted or unsubstituted, monocyclic or polycyclic aromatic group having 6 to 30 carbons. Ar, Ar¹, and Ar² can be the same as or different from each other. Additionally, two of Ar, Ar¹, and Ar² can be the same as each other and the third can be different. In some embodiments Ar, Ar¹, and Ar² are phenyl groups.

Aromatic polyketones are generally known, with many examples being commercially available. Examples of commercially available aromatic polyketones include those sold under the trade name PEEK™, available from VICTREX.

The aromatic polyketone can be present in an amount of 1 to 95 weight percent (wt %), or 5 to 75 weight percent (wt %) based on the total weight of the composition. Within this range, the aromatic polyketone can be present in an amount greater than or equal to 5 wt %, or greater than or equal to 10 wt %, or greater than or equal to 25 wt %. Also within this range the aromatic polyketone can be present in an amount less than or equal to 90 wt %, or less than or equal to 75 wt %, or less than or equal to 50 wt %.

The poly(etherimide-siloxane) copolymers comprise polyetherimide units and polysiloxane units, for example 5 to 1000, or 10 to 500, etherimide units and siloxane units. The polyetherimide units comprise structural units of formula (5)

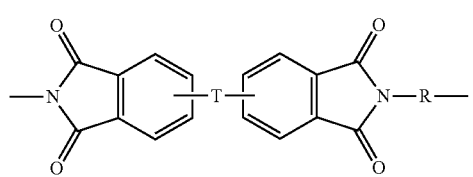

(5)

wherein each R is the same or different, and is a substituted or unsubstituted divalent organic group, such as a $C_{6-20}$ aromatic hydrocarbon group or a halogenated derivative thereof, a straight or branched chain $C_{2-20}$ alkylene group or a halogenated derivative thereof, a $C_{3-8}$ cycloalkylene group or halogenated derivative thereof, in particular a divalent group of any of the formulas

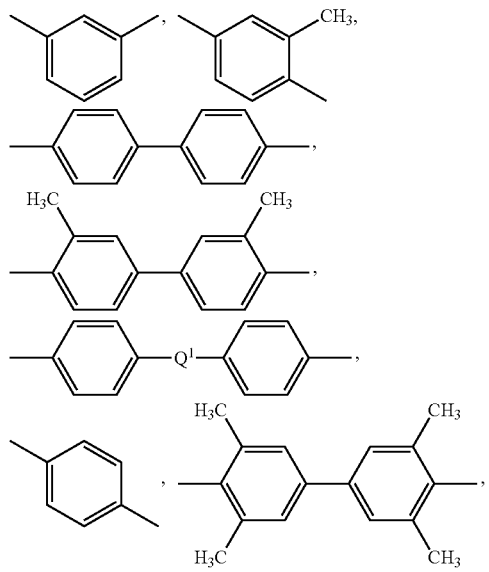

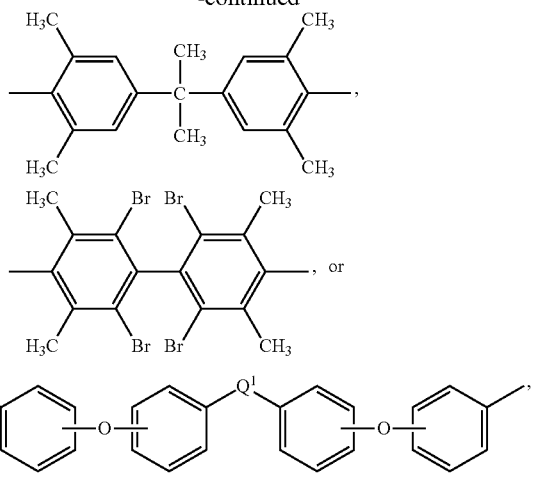

wherein $Q^1$ is —O—, —S—, —C(O)—, —SO$_2$—, —SO—, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an embodiment R is m-phenylene, p-phenylene, or a diaryl sulfone.

Further in formula (5), T is —O— or a group of the formula —O—Z—O— wherein the divalent bonds of the —O— or the —O—Z—O— group are in the 3,3',3,4',4,3', or the 4,4' positions. The group Z in —O—Z—O— of formula (5) is also a substituted or unsubstituted divalent organic group, and can be an aromatic $C_{6-24}$ monocyclic or polycyclic moiety optionally substituted with 1 to 6 $C_{1-8}$ alkyl groups, 1 to 8 halogen atoms, or a combination thereof, provided that the valence of Z is not exceeded. Exemplary groups Z include groups derived from a dihydroxy compound of formula (6)

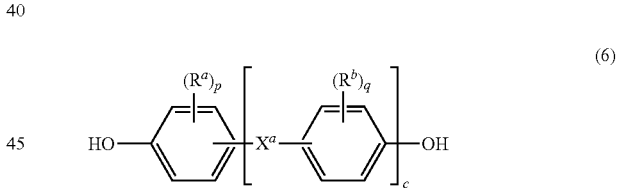

(6)

wherein $R^a$ and $R^b$ can be the same or different and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (6a)

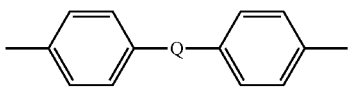
(6a)

wherein Q is —O—, —S—, —C(O)—, —SO$_2$—, —SO—, or —C$_y$H$_{2y}$— wherein y is an integer from 1 to 5 or a halogenated derivative thereof (including a perfluoroalkylene group). In a specific embodiment Z is a derived from bisphenol A, such that Q in formula (6a) is 2,2-isopropylidene.

In an embodiment in formula (5), R is m-phenylene or p-phenylene and T is —O—Z—O— wherein Z is a divalent group of formula (6a). Alternatively, R is m-phenylene or p-phenylene and T is —O—Z—O— wherein Z is a divalent group of formula (6a) and Q is 2,2-isopropylidene.

The polyetherimide blocks can be prepared by any of the methods well known to those skilled in the art, including the reaction of an aromatic bis(ether anhydride) of formula (7) with an organic diamine of formula (8)

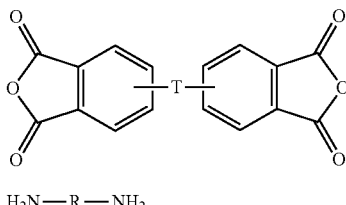
(7)

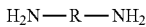
(8)

wherein T and R are defined as described above. Copolymers of the polyetherimides can be manufactured using a combination of an aromatic bis(ether anhydride) of formula (7) and a different bis(anhydride), for example a bis(anhydride) wherein T does not contain an ether functionality, for example T is a sulfone.

Illustrative examples of bis(anhydride)s include 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 2,2-bis[4-(2,3-dicarboxyphenoxy)phenyl]propane dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy)benzophenone dianhydride; 4,4'-bis(2,3-dicarboxyphenoxy)diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy)benzophenone dianhydride; and, 4-(2,3-dicarboxyphenoxy)-4'-(3,4-dicarboxyphenoxy)diphenyl sulfone dianhydride, as well as various combinations thereof.

Examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylenediamine, 5-methyl-4,6-diethyl-1,3-phenylenediamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone, and bis(4-aminophenyl) ether. Combinations of these compounds can also be used. In some embodiments the organic diamine is m-phenylenediamine, p-phenylenediamine, sulfonyl dianiline, or a combination comprising one or more of the foregoing.

The siloxane blocks contain units of formula (9)

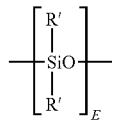
(9)

wherein each R' is independently a C$_{1-13}$ monovalent hydrocarbyl group. For example, each R' can independently be a C$_{1-13}$ alkyl group, C$_{1-13}$ alkoxy group, C$_{2-13}$ alkenyl group, C$_{2-13}$ alkenyloxy group, C$_{3-6}$ cycloalkyl group, C$_{3-6}$ cycloalkoxy group, C$_{6-14}$ aryl group, C$_{6-10}$ aryloxy group, C$_{7-13}$ arylalkyl group, C$_{7-13}$ arylalkoxy group, C$_{7-13}$ alkylaryl group, or C$_{7-13}$ alkylaryloxy group. The foregoing groups can be fully or partially halogenated with fluorine, chlorine, bromine, or iodine, or a combination comprising at least one of the foregoing. In an embodiment no bromine or chlorine is present, and in another embodiment no halogens are present. Combinations of the foregoing R groups can be used in the same copolymer. In an embodiment, the polysiloxane blocks comprise R' groups that have minimal hydrocarbon content. In a specific embodiment, an R' group with a minimal hydrocarbon content is a methyl group.

The poly(etherimide-siloxane)s can be formed by polymerization of an aromatic bisanhydride (7) and a diamine component comprising an organic diamine (8) as described above or mixture of diamines, and a polysiloxane diamine of formula (10)

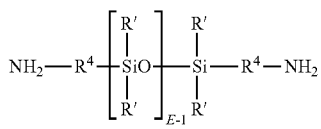
(10)

wherein R' and E are as described in formula (9), and each R$^4$ is independently a C$_2$-C$_{20}$ hydrocarbon moiety, in particular a C$_2$-C$_{20}$ arylene, alkylene, or arylenealkylene group. In an embodiment R$^4$ is a C$_2$-C$_{20}$ alkylene group, specifically a $C_2$-$C_{10}$ alkylene group such as propylene, and E has an average value of 5 to 100, 5 to 75, 5 to 60, 5 to 15, or 15 to 40. Procedures for making the polysiloxane diamines of formula (8) are well known in the art.

In some poly(etherimide-siloxane) copolymers the diamine component used in the manufacture of the copolymers can contain 10 to 90 mole percent (mol %), or 20 to 50 mol %, or 25 to 40 mol % of polysiloxane diamine (10) and 10 to 90 mol %, or 50 to 80 mol %, or 60 to 75 mol % of diamine (8), for example as described in U.S. Pat. No. 4,404,350. The diamine components can be physically mixed prior to reaction with the bisanhydride(s), thus forming a substantially random copolymer. Alternatively, block or alternating copolymers can be formed by selective reaction of (8) and (10) with aromatic bis(ether anhydrides) (7), to make polyimide blocks that are subsequently reacted together. Thus, the poly(etherimide-siloxane) copolymer can be a block, random, or graft copolymer. Block poly(etherimide-siloxane) copolymers comprise etherimide blocks and siloxane blocks in the polymer backbone. The etherimide blocks and the siloxane blocks can be present in random order, as blocks (i.e., AABB), alternating (i.e., ABAB), or a combination thereof. Graft poly(etherimide-siloxane) copolymers are non-linear copolymers comprising the siloxane blocks connected to linear or branched polymer backbone comprising etherimide blocks.

Examples of specific poly(etherimide-siloxane)s are described in U.S. Pat. Nos. 4,404,350, 4,808,686 and 4,690,997. In an embodiment, the poly(etherimide-siloxane) has units of formula (11)

polyetherimide polymer has a weight average molecular weight (Mw) of 1,000 to 150,000 Daltons, or 10,000 to 80,000 Daltons, as measured by gel permeation chromatography, using polystyrene standards. Such polyetherimide polymers typically have an intrinsic viscosity greater than 0.2 deciliters per gram (dl/g), or, more specifically, 0.35 to 0.7 dl/g as measured in m-cresol at 25° C. The poly (etherimide-siloxane) copolymer can have a number average molecular weight (Mn) of 5,000 to 50,000 Daltons, or 10,000 to 30,000 Daltons.

The thermoplastic composition can comprise a combination of two or more poly(etherimide-siloxane) copolymers. The copolymers can be used in any proportion. For example, when two copolymers are used the weight ratio of the first copolymer to the second copolymer can be 1:99 to 99:1. Ternary blends and higher are also contemplated.

The poly(etherimide-siloxane) copolymer is present in an amount of 5 to 99 wt %, or 25 to 95 wt % based on the total weight of the composition. Within this range, the poly (etherimide-siloxane) copolymer can be present in an amount greater than or equal to 10 wt %, or greater than or equal to 25 wt %. Also within this range, the poly(etherimide-siloxane) copolymer can be present in an amount of less than or equal to 95 wt %, or less than or equal to 90 wt %, or less than or equal to 75 wt %.

In some embodiments, the composition comprising the poly(etherimide-siloxane) copolymer and the aromatic polyketone has a siloxane content, based on the total weight of the composition of 1 to 25 wt %. Within this range the siloxane content can be greater than or equal to 5 wt %, or

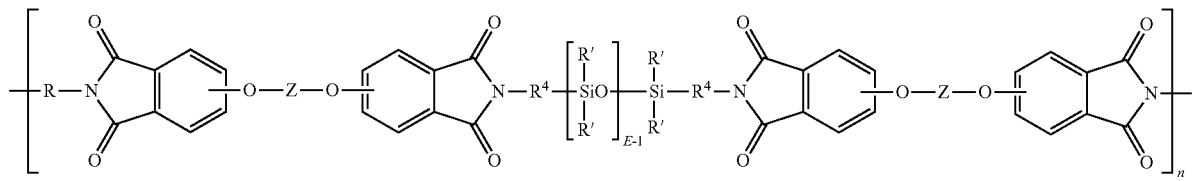

(11)

wherein R' and E of the siloxane are as in formula (9), the R and Z of the imide are as in formula (5), $R^4$ is the same as $R^4$ as in formula (10), and n is an integer from 5 to 100. In a specific embodiment, the R is a phenylene, Z is a residue of bisphenol A, $R^4$ is n-propylene, E is 2 to 50, 5 to 30, or 10 to 40, n is 5 to 100, and each R' of the siloxane is methyl.

The relative amount of polysiloxane units and etherimide units in the poly(etherimide-siloxane) depends on the desired properties, and are selected using the guidelines provided herein. In particular, the poly(etherimide-siloxane) copolymer is selected to have a certain average value of E, and is selected and used in amount effective to provide the desired weight percent (wt %) of siloxane units in the thermoplastic composition. In an embodiment the poly (etherimide-siloxane) comprises 5 to 50 wt %, 10 to 40 wt %, or 20 to 35 wt % siloxane units, based on the total weight of the poly(etherimide-siloxane). In some embodiments the polysiloxane block of the copolymer has a number average molecular weight (Mn) of 300 to 3000 grams/mole (Daltons).

The polyetherimides can have a melt index of 0.1 to 10 grams per minute (g/min), as measured by American Society for Testing Materials (ASTM) D1238 at 340 to 370° C., using a 6.7 kilogram (kg) weight. In some embodiments, the greater than or equal to 7 wt %. Also within this range, the siloxane content can be less than or equal to 23 wt %.

The thermoplastic composition optionally further includes additives known in the art for use in wire coating applications, provided that the additives do not substantially adversely affect the desired properties of the compositions. Such additives include reinforcing fillers, UV absorbers, light stabilizers, heat stabilizers, lubricants, plasticizers, pigments, dyes, colorants, anti-static agents, foaming agents, blowing agents, metal deactivators, antioxidants, nucleating agents, and combinations comprising one or more of the foregoing additives.

Examples of reinforcing fillers include glass beads (hollow and/or solid), glass flake, milled glass, glass fibers, talc, wollastonite, silica, mica, kaolin or montmorillonite clay, silica, quartz, barite, and the like, or a combination comprising any of the foregoing reinforcing fillers.

Antioxidants can be compounds such as phosphites, phosphonites and hindered phenols or mixtures thereof. Phosphorus containing stabilizers including triaryl phosphite and aryl phosphonates are of note as useful additives. Difunctional phosphorus containing compounds can also be employed. Stabilizers can have a molecular weight greater than or equal to 300. In some embodiments, phosphorus containing stabilizers with a molecular weight greater than or equal to 500 are useful. Flow aids and mold release compounds are also contemplated. When present, the total amount of organic additive is 0 to 5 percent by weight, based on the combined weight of the polymer components. In some embodiments, the composition contains no additives.

A color concentrate or master batch can optionally be added to the composition prior to or during extrusion coating. When a color concentrate is used it is typically present in an amount less than or equal to 3 weight percent, based on the total weight of the composition. In one embodiment the master batch comprises a poly(etherimide-siloxane) copolymer.

The reinforcing filler can be present in an amount less than or equal to 60 weight percent, based on the total weight of the composition. Within this range the reinforcing filler can be present in an amount greater than or equal to 10 weight percent, or greater than or equal to 20 weight percent. Also within this range the reinforcing filler can be present in an amount less than or equal to 50 weight percent, or less than or equal to 40 weight percent.

The thermoplastic composition can be prepared by melt mixing or a combination of dry blending and melt mixing. Melt mixing can be performed in single or twin screw type extruders or similar mixing devices which can apply a shear and heat to the components. Melt mixing can be performed at temperatures greater than or equal to the melting temperatures of the copolymers and less than the degradation temperatures of either of the copolymers.

All of the ingredients can be added initially to the processing system. In some embodiments, the ingredients can be added sequentially and/or through the use of one or more master batches. It can be advantageous to apply a vacuum to the melt through one or more vent ports in the extruder to remove volatile impurities in the composition. In some embodiments melt-mixing is performed using an extruder and the composition exits the extruder in a strand or multiple strands. The shape of the strand is dependent upon the shape of the die used and has no particular limitation. In some embodiments the composition is the product of melt-mixing the polymers and, when present, any additives.

Before coating onto a conductor wire as described below, the thermoplastic compositions can have a desirable combination of properties, such properties being determined in the absence of the conductor wire.

For example, the thermoplastic compositions can have a flexural modulus of 800 to 4000 megapascals (MPa), or 1000 to 3000 MPa as measured according to ASTM D790.

The thermoplastic compositions can have a tensile stress at break of 30 to 100 MPa, or 30 to 90 MPa, as measured according to ASTM D638.

The thermoplastic compositions can have an elongation to beak of 20 to 175%, or 75 to 160%, as measured according to ASTM D638.

The thermoplastic compositions can have a notched Izod impact strength of 200 to 1800 Joules per meter (J/m).

In some embodiments melt mixing is performed using an extruder and the composition exits the extruder in a strand or multiple strands. The shape of the strand is dependent upon the shape of the die used and has no particular limitation.

A coated wire comprises a conductor and a covering disposed over the conductor wire. The covering comprises the previously described thermoplastic composition. The composition is applied to the conductor wire by a suitable method such as extrusion coating to form a coated wire. For example, a coating extruder equipped with a screw, cross-head, breaker plate, distributor, nipple, and die can be used. The melted thermoplastic composition forms a covering disposed over a circumference of the conductor wire. Extrusion coating can employ a single taper die, a double taper die, other appropriate die or combination of dies to position the conductor centrally and avoid die lip build-up.

In some embodiments it can be useful to dry the thermoplastic composition before extrusion coating. Exemplary drying conditions are 60 to 110° C. for 2 to 20 hours.

In some embodiments, during extrusion coating, the thermoplastic composition is melt filtered, prior to formation of the coating, through one or more filters. In some embodiments the thermoplastic composition will have substantially no particles greater than 80 micrometers in size. In some embodiments any particulates present will be less than or equal to 40 micrometers in size. In some embodiments there will be substantially no particulates greater than 20 micrometers in size. The presence and size of particulates can be determined using a solution of 1 gram of thermoplastic composition dissolved in 10 milliliters of a solvent, such as chloroform, and analyzing it using microscopy or light scattering techniques. Substantially no particulates is defined as having less than or equal to 3 particulates, or, more specifically, less than or equal to 2 particulates, or, even more specifically, less than or equal to 1 particulate per one gram sample. Low levels of particulates are beneficial for giving a layer of insulation on a coated wire that will not have electrically conductive defects as well as providing coatings with improved mechanical properties.

The extruder temperature during extrusion coating is generally less than the degradation temperature of the aromatic polyketone and poly(etherimide-siloxane) copolymer. Additionally the processing temperature is adjusted to provide a sufficiently fluid molten composition to afford a covering for the conductor, for example, higher than the softening point of the thermoplastic composition, or more specifically at least 20° C. higher than the melting point of the thermoplastic composition.

After extrusion coating the conductive wire is usually cooled using a water bath, water spray, air jets or a combination comprising one or more of the foregoing cooling methods. Exemplary water bath temperatures are 20 to 90° C., or 80 to 90° C.

In some embodiments, the composition is applied to the conductor wire to form a covering disposed over and in physical contact with the conductor wire. Additional layers can be applied to the covering. Any methods of coating a conductor wire that are generally known can be used. In some embodiments, the composition is applied to a conductor wire having one or more intervening layers between the conductor wire and the covering to form a covering disposed over the conductor wire. For instance, an optional adhesion promoting layer can be disposed between the conductor wire and covering. In another example the conductor wire can be coated with a metal deactivator prior to applying the covering. Alternatively, a metal deactivator can be mixed with the thermoplastic composition. In another example the intervening layer comprises a thermoplastic or thermoset composition that, in some cases, is foamed.

The conductor can comprise a single strand or a plurality of strands. In some cases, a plurality of strands can be bundled, twisted, braided, or a combination of the foregoing to form a conductor. Additionally, the conductor can have various shapes such as round or oblong. Suitable materials for the conductor wires include, but are not limited to, copper, aluminum, lead, gold, silver, iron, nickel, chromium, and alloys comprising at least one of the foregoing metals.

In an exemplary embodiment, the conductor wire is copper. The conductor wire can also be coated with, e.g., tin, gold or silver. In some embodiments the conductor wire comprises optical fibers.

The cross-sectional area of the conductor and thickness of the covering can vary and is typically determined by the desired application for the coated wire. The coated wire can be used as coated wire without limitation, including, for example, for harness wire for automobiles, wire for household electrical appliances, wire for electric power, wire for instruments, wire for information communication, wire for electric cars, as well as ships, airplanes, and the like. Specific applications that can benefit from coated electrical wires comprising the thermoplastic composition are those requiring high-heat, thin-walled wire coatings, for example for high-heat train, automobile, aircraft, and data transmission applications. In some specific embodiments, an article can comprise the electrical wire having a covering comprising the thermoplastic composition, wherein the article is a railway vehicle component, an automobile component, or an aircraft component.

In some embodiments the covering can have a thickness of 0.01 to 10 millimeters (mm) or, more specifically, 0.05 to 5 mm, or, even more specifically 0.1 to 1 mm.

Multiple coated wires can be combined to form a cable. The cable can comprise additional protective elements, structural elements, or a combination thereof. An exemplary protective element is a jacket which surrounds the group of coated wires. The jacket and the covering on the coated wires, singly or in combination, can comprise the thermoplastic composition described herein. A structural element is a typically non-conductive portion which provides additional stiffness, strength, shape retention capability or the like.

The poly(etherimide-siloxane) thermoplastic compositions provided are cost-effective, and demonstrate improved physical properties, including low flammability, low toxicity, high temperature stability, low flexural modulus, high tensile elongation, and in some embodiments high tear strength. Therefore, a substantial improvement in thermoplastic compositions for use as electrical wire coatings is provided.

The thermoplastic compositions coating the conductor wire can have a wire tensile stress at break of greater than 30 MPa, or 35 to 100 MPa, or 55 to 90 MPa, as extruded and measured according to UL1581. An electrical wire comprising a covering comprising the thermoplastic composition can further have a tensile stress at break of greater than 30 MPa, or 35 to 100 MPa, or 55 to 90 MPa, after heat aging at 178° C. for 168 hours and measured according to UL1581.

The thermoplastic compositions coating the conductor wire can have a wire tensile elongation of greater than 100%, or 120 to 160%, as extruded, and measured according to UL1581. An electrical wire comprising a covering comprising the thermoplastic composition can further have a wire tensile elongation of greater than 50%, or 50 to 150% after heat aging at 178° C. for 168 hours and as measured according to UL1581.

An electrical wire comprising a covering comprising the thermoplastic composition can pass both a VW1 and a VDE flame test.

An electrical wire comprising a covering comprising the thermoplastic composition can have a wire tear strength of greater than 25 N/mm, or greater than 30 N/mm, or 30 to 100 MPa, measured using a tear speed of 100 mm/min.

The thermoplastic composition can be coextruded with an additional thermoplastic composition to form a multi-layer article. The additional thermoplastic composition can comprise polyaryletherketone, poly(arylene ether), polysulfone, polyolefin, polyamide, or a combination comprising at least one of the foregoing.

The thermoplastic composition can be injection molded and/or thermoformed to form an article as well. Advantageously, the present composition now provides for a previously unmet need for a composition that has a ductility that is better than aromatic polyketones such as polyaryletherketones, that retains the advantageous processing features found in aromatic polyketones, and displays a lower toxicity. Users can now make a variety of articles that exhibit performance properties that are valued by their respective customers, for example in subway, aircraft, and passenger vehicle applications Further information is provided by the following non-limiting examples.

EXAMPLES

The materials used in the following examples are described in Table 1.

TABLE 1

| Material | Description and Supplier |
|---|---|
| PEEK-1 | A polyetheretherketone commercially available from PANJIN ZhongRun High Performance Polymer Co., Ltd. as CoPEEK 085G. |
| PEEK-2 | A polyetheretherketone commercially available from VICTREX as PEEK 150 G. |
| STM1700 | A poly(etherimide-siloxane) extended block copolymer having a siloxane content of 20 weight percent, based on the total weight of the block copolymer, available as SILTEM ™ from SABIC. |
| STM1500 | A poly(etherimide-siloxane) extended block copolymer having a siloxane content of 40 weight percent, based on the total weight of the block copolymer, available as SILTEM ™ from SABIC. |

Examples 1-8 and Comparative Examples 1-4 were prepared by melt-mixing using a two lobe 24 millimeter (mm) co-rotating intermeshing twin-screw extruder. Unless otherwise specified, the components were added at the feed throat of the extruder. The extruder was set with barrel temperatures of 300 to 370° C. The material was run at 28-32 kilograms per hour (kg/hr) with the screw rotating at 400 rotations per minute (rpm). The compounding profile used to prepare the samples is shown in Table 2 below.

TABLE 2

| Parameters | Unit | Set Values |
|---|---|---|
| Zone 1 temp. | ° C. | 50 |
| Zone 2 temp. | ° C. | 180 |
| Zone 3 temp. | ° C. | 250 |
| Zone 4 temp. | ° C. | 300 |
| Zone 5 temp. | ° C. | 360 |
| Zone 6 temp. | ° C. | 360 |
| Zone 7 temp. | ° C. | 360 |
| Zone 8 temp. | ° C. | 360 |
| Zone 9 temp. | ° C. | 360 |
| Zone 10 temp. | ° C. | 360 |
| Zone 11 temp. | ° C. | 360 |
| Die temp. | ° C. | 365 |
| Screw speed | rpm | 400 |
| Throughput | kg/hr | 30 |

Compositions were injection molded according to the following injection molding profile in Table 3.

TABLE 3

| Parameters | Unit | Set Values |
|---|---|---|
| Cnd: Pre-drying time | Hour | 6 |
| Cnd: Pre-drying temp. | ° C. | 105 |
| Hopper temp. | ° C. | 50 |
| Zone 1 temp. | ° C. | 355 |
| Zone 2 temp. | ° C. | 360 |
| Zone 3 temp. | ° C. | 360 |
| Nozzle temp. | ° C. | 365 |
| Mold temp. | ° C. | 120 |
| Screw speed | rpm | 100 |
| Back pressure | kgf/cm$^2$ | 90 |
| Decompression | Mm | 6 |
| Injection time | s | 2 |
| Holding time | s | 8 |
| Cooling time | s | 20 |
| Shot volume | mm | 58 |
| Switch point | mm | 10 |
| Injection speed | mm/s | 25 |
| Holding pressure | kgf/cm$^2$ | 600 |
| Cushion | mm | 4 |

Test parts were injection molded at 340 to 370° C. using a 30 second cycle time from compositions dried for at least 4 hours at 150 to 170° C. prior to injection molding. All molded samples were conditioned for at least 48 hours at 23° C. and 50% relative humidity prior to testing.

Coated wire samples were also prepared, where the coating comprises the thermoplastic composition described above. The samples were prepared using a WTL EXL50 extrusion coating machine. The wire used was American Wire Gauge (AWG) 18 copper conductor wire. The composition, in pelleted form, was dried at 105° C. for 8 hours prior to extrusion. The wire was pre-heated at 120 to 140° C. and subsequently extrusion coated with the thermoplastic composition at a temperature of 360° C., followed by hot water cooling at a temperature of 80-90° C. The line speed was 50-100 m/min. The wire coating thickness was 0.1 to 1 mm, specifically 0.25 mm.

The wire samples were tested for tensile stress and elongation to break according to UL1581; results are reported in MPa and %, respectively. Testing was done both before and after heat aging at 178° C. for 168 hours. Heat aging was conducted in an oven. Wire tensile measurements were performed on an Instron 3365, which is an electro-mechanical Universal Testing Machine (UTM). Test samples of 80-100 mm in length were slit open from wire sample using a fresh razor blade. As the insulation is hard, they could not be stripped using a conventional wire-stripper. The end of the sample was wrapped with aluminum foil, to avoid jaw crush. The sample was then gripped using the pneumatic grip with 30 psi pressure. The extensometer was attached to the sample, the tension in the extensometer is adjusted to ensure no slippage of the extensometer and no breakage of the sample happens during gripping and testing.

VW1 and VDE flame tests were conducted on single wires, according to UL1581 and EN50265-2-1/IEC60332-1, respectively. Conventional toxicity index (ITC) was carried out as per DIN standard, EN50305. As per the protocol, test was carried out to measure concentration of gases evolved when 1 gram of sample is burned in a volume of 1 cubic meter (m$^3$). The concentrations of evolved gases (CO, $CO_2$, $SO_2$, HCN and $NO_x$) were measured. The toxicity index is measured by the formula $$I.T.C.=100\times\Sigma(t_i/C_{ci})$$

wherein $t_i$ are measured concentrations and $C_{ci}$ are critical concentrations as mentioned by the standards. The ITC value, as such, is unit-less, but is a % of ratio of concentrations.

Physical testing of the compositions and the coated wires was conducted according to the standards summarized in Table 4. Unless indicated otherwise, all tests are the test in effect in the year 2010. Tensile modulus, tensile strength, and elongation to break were determined according to ASTM D 638 on 3.2 millimeter thick type I bars. Tensile strength is reported at yield. Flexural modulus and flexural strength were determined according to ASTM method D790 and results are reported in MPa.

TABLE 4

| | Test Standard | Specimen Type | Units |
|---|---|---|---|
| Notched Izod Impact | ASTM D256 at 23° C. | 3.2 millimeter thick bars | J/m |
| Flexural Test | ASTM D790 | Bar - 127 × 12.7 × 3.2 mm | MPa |
| Filled Tensile Test | ASTM D638 | ASTM Type I Tensile bar | MPa, % |
| Shore D | ASTM D 2240 | Overlap 2 Color chips 80 × 50 × 3.2 mm | |
| Tear strength | ISO 34-1 | Bar - 127 × 12.7 × 1.6 mm | N/mm |
| Melt Flow Rate (MFR) | ASTM D1238 | Pellets | g/10 min |
| Heat Distortion Temperature (HDT) | ASTM D648 | Bar - 127 × 12.7 × 3.2 mm | ° C. |
| Wire Tensile Test | UL1581 | Single wire | MPa, % |
| Wire VW-1, 1 C | UL1581 | Single wire | |
| Wire VDE | EN50265-2-1/IEC60332-1 | Single wire | |
| 94Vx | UL94 | Flame bar - 127 × 12.7 × 1.6 or 1.0 mm | |
| Toxicity (ITC value) | EN50305 | Pellet/Single wire | |

For each of the Examples, the polymer components and any additives were melt-mixed in the amounts shown in the Tables, extruded, and the compositions were characterized as described above.

The physical properties of coated wires were characterized following extrusion of the compositions to form a covering disposed on the surface of a copper conductor wire.

Examples 1-8 and Comparative Examples 1-4

Examples 1-8 and Comparative Examples 1-4 were prepared, molded, and tested as described above. Compositions and results are shown in Table 5.

TABLE 5

|  | Units | CE1 | CE2 | CE3 | CE4 | E1 | E2 | E3 | E4 | E5 | E6 | E7 | E8 |
|---|---|---|---|---|---|---|---|---|---|---|---|---|---|
| Component | | | | | | | | | | | | | |
| STM1500 | wt % | 100 | | | | 45 | | | | | | | |
| STM1700 | wt % | | 100 | | | 45 | 75 | 70 | 60 | 50 | 50 | 40 | 25 |
| PEEK-1 | wt % | | | 100 | | | 25 | 30 | 40 | | 50 | 60 | 75 |
| PEEK-2 | wt % | | | | 100 | 5 | | | | 50 | | | |
| Properties | | | | | | | | | | | | | |
| Flexural modulus | MPa | 327 | 2150 | 3010 | 3000 | 1330 | 2060 | 2090 | 2120 | 2450 | 2190 | 2320 | 2810 |
| Flexural stress | MPa | 10.4 | 94 | 134 | 138 | 56 | 106 | 105.7 | 108.2 | 107 | 99.7 | 105 | 118 |
| Shore D hardness | | 58.7 | 88.4 | | | | | | | | 84.2 | 85 | |
| Tensile modulus | MPa | 419.6 | 2410 | 3417 | 3424 | 1520 | 2320 | 2390 | 2460 | 2750 | 2546 | 267.4 | 3160 |
| Tensile stress | MPa | 19.5 | 53 | 58.7 | 58.5 | 39.1 | 65.5 | 69.3 | 76 | 75.9 | 83.7 | 81.4 | 81.2 |
| Tensile elongation | % | 51.97 | 20 | 27.1 | 34.5 | 102 | 111 | 127.4 | 143.2 | 144 | 158.1 | 123.3 | 147 |
| NII | J/m | 520 | 110 | 48.3 | 49.7 | 438 | 347 | 483 | 598 | 761 | 537 | 490 | 160 |
| HDT | ° C. | 55 | 145 | 143 | 148 | 103 | 144.3 | 143.9 | 139.5 | 139.7 | 137 | 141 | 140.7 |
| Specific Gravity | | 1.18 | 1.2 | 1.29 | 1.29 | 1.19 | 1.24 | 1.24 | 1.25 | 1.25 | 1.25 | 1.26 | |
| UL 94 Vx, 1.0 mm | | V0 | V0 | V0 | V0 | V0 | V0 | V0 | V0 | V0 | V0 | V0 | V0 |
| UL 94 Vx, 1.6 mm | | V0 | V0 | V0 | V0 | V0 | V0 | V0 | V0 | V0 | V0 | V0 | V0 |
| MFR [1] | g/10 min | 12 | | | | | | | | | | | |
| MFR [2] | g/10 min | | 62.5 | | | 67.6 | 45.2 | 45.2 | 21.4 | | | | |
| MFR [3] | g/10 min | | | | | | | | | 149 | 79.4 | 85.3 | 121 |
| MFR [4] | g/10 min | | | 27.6 | 24.7 | | | | | | | | |
| Tear strength | N/mm | 14.01 | 16.1 | 55 | 54 | 16.5 | 28.6 | 30.25 | 36.6 | 38.25 | 49.4 | 51.36 | 41.7 |
| ITC | | 20.4 | 19 | 2.3 | 1.9 | 17.5 | 12.7 | 12.5 | 11.6 | 10 | 12.2 | 9.45 | 7 |
| Wire tensile stress [5] | MPa | 24.22 | 51.33 | | | 36.7 | 55.6 | 59.9 | 68.4 | 79.3 | 71.61 | 75.43 | 79.6 |
| Wire tensile elong. [5] | % | 117.6 | 85 | | | 125.4 | 128.6 | 138.1 | 146.9 | 154.9 | 154.2 | 140.8 | 143.7 |
| Wire tensile stress [6] | MPa | 25 | 55.32 | | | 36.2 | 56.6 | 60.2 | 69.6 | 84.5 | 77.08 | 79.03 | 81.3 |
| Wire tensile elong. [6] | % | 84.73 | 44.6 | | | 103.1 | 111 | 115.8 | 124.5 | 138 | 130.1 | 122.5 | 121.1 |
| Wire VW1 FR | | Pass | Pass | Pass | Pass | Pass | Pass | Pass | Pass | Pass | Pass | Pass | Pass |
| Wire VDE FR | | Pass | Pass | Pass | Pass | Pass | Pass | Pass | Pass | Pass | Pass | Pass | Pass |
| Wire tear strength | N/mm | 22.1 | 26 | 64 | 65 | 26.5 | 35.6 | 40.7 | 55.8 | 66.6 | 62.1 | 64.3 | 59.8 |

[1] 295° C., 6.7 kg, 300 s;
[2] 337° C., 6.7 kg, 300 s;
[3] 367° C., 6.7 kg, 300 s;
[4] 400° C., 2.16 kg, 300 s;
[5] 23° C., 24 hours;
[6] 178° C., 168 hours Comparative Examples 1-4

Comparative Examples 1 and 2 (CE1 and CE2) demonstrate the performance of a wire coating comprising a poly(etherimide-siloxane) copolymer. CE1 showed good wire tensile elongation of greater than 100% at 23° C., with good retention following heat aging at 178° C. for 168 hours. The wire tensile stress was observed to be low for CE1, and a wire tear strength of only 22.1 N/mm was observed. CE2 showed a similar trend in tensile elongation properties before and after heat aging. CE2 also showed enhanced wire tensile stress before and after aging compared to the performance of CE1. Furthermore, toxicity tests showed CE1 and CE2 had high ITC values of 20.4 and 19 respectively. Both CE1 and CE2 were able to pass the VW1 and VDE flame tests.

Comparative Examples 3 and 4 (CE3 and CE4) provide insight to the properties of compositions comprising PEEK. CE3 and CE4 showed relatively low toxicity, and were able to pass the VW1 and VDE flame tests. Furthermore, the wire tear strength was much higher than CE1 or CE2 at 64-65 N/mm.

Examples 1-8

The thermoplastic compositions comprising the polymer blends of Examples 1-8 (E1-E8) overall demonstrated superior properties to the compositions of the comparative examples. The compositions of E1-E8 passed VW1 and VDE flame testing, and achieved a UL94 V0 rating at both 1.6 and 1.0 mm thickness. To achieve a UL Flame rating of V0, in a sample placed so that its long axis is 180 degrees to the flame, the average period of flaming and/or smoldering after removing the igniting flame does not exceed ten seconds and none of the vertically placed samples produces drips of burning particles that ignite absorbent cotton. E1-E8 all showed superior Notched Izod impact strength (greater than 100 J/m) and better tensile elongation (greater than 100%). When the PEEK loading was greater than or equal to 30 weight percent (E3-E8), the compositions showed improved tear strength and toxicity, with ITC values less than 15. Furthermore, the extruded coated wire samples showed superior tear strengths of greater than 30 N/mm. The tensile properties of the wire were well maintained following heat aging.

The results shown in Table 5 show that wire coatings made from PEEK and SILTEM polymer blends exhibited unexpectedly better results than coatings prepared from PEEK or SILTEM alone. Specifically, good flame retardant properties, good tear strength, and low toxicity of the coated electrical wires were observed. The results suggest such compositions can be particularly useful in the fabrication of articles comprising coated wires in high-heat applications, including railway vehicle components, automobile components, marine vehicle components, aircraft components, or data transmission components.

The articles and electrical wires comprising the thermoplastic composition are further illustrated by the following embodiments, which are non-limiting.

Embodiment 1

An article comprising an electrical wire, wherein the electrical wire comprises a conductor wire; and a covering disposed over the conductor wire, wherein the covering is formed from a thermoplastic composition comprising, 5-75 weight percent aromatic polyketone; and 25-95 weight percent poly(etherimide-siloxane) copolymer having a siloxane content of more than 0 to less than 50 weight percent based on the total weight of the poly(etherimide-siloxane) copolymer; wherein all weight percents are based on the total weight of the composition; and wherein the thermoplastic composition coating the conductor wire has one or more of the following properties: a tensile stress of greater than 30 MPa, determined according to UL-1581 after 24 hours at 23° C.; a tensile elongation of greater than 100%, determined according to UL-1581 after 24 hours at 23° C.; and achieves a pass rating in the single wire vertical flame propagation test conducted according to EN50265-2-1/IEC60332-1, as determined in the presence of the wire conductor.

Embodiment 2

The article of embodiment 1, wherein the electrical wire has: a tensile stress of greater than 30 MPa, determined according to UL-1581 after heat aging for 168 hours at 178° C.; and a tensile elongation of greater than 50%, determined according to UL-1581 after heat aging for 168 hours at 178° C.

Embodiment 3

The article of embodiment 1 or 2, wherein the electrical wire achieves a pass rating in the single wire burn test conducted according to UL-1581 VW1.

Embodiment 4

The article of any one or more of embodiments 1 to 3, wherein the electrical wire has a tear strength of greater than 25 N/mm, preferably greater than 30 N/mm, determined according to ISO 34-1.

Embodiment 5

The article of any one or more of embodiments 1 to 4, wherein the poly(etherimide-siloxane) copolymer is a block copolymer having a siloxane content of 5 to 50 weight percent, based on the total weight of the block copolymer, and comprises repeating units of the formula

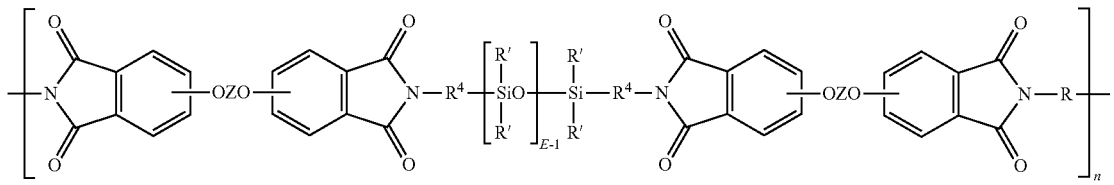

wherein Z is a residue of bisphenol A, $R^4$ is n-propylene, E is 2 to 50, n is 5 to 100, and each R' is methyl.

Embodiment 6

The article of any one or more of embodiments 1 to 5, wherein the aromatic polyketone comprises polyetherketone, polyetheretherketone, polyetherketone, polyaryletherketone, or a combination comprising at least one of the foregoing.

Embodiment 7

The article of any one or more of embodiments 1 to 6, wherein the aromatic polyketone comprises polyetheretherketone.

Embodiment 8

The article of any one or more of embodiments 1 to 7, wherein the thermoplastic composition comprises 40 to 60 weight percent of polyetheretherketone.

Embodiment 9

The article of any one or more of embodiments 1 to 8, wherein the thermoplastic composition achieves a V0 rating at a thickness of 1.0 mm and 1.6 mm according to UL94 Vx.

Embodiment 10

The article of any one or more of embodiments 1 to 9, wherein the thermoplastic composition has an ITC value of less than or equal to 15, as determined according to EN50305.

Embodiment 11

The article of any one or more of embodiments 1 to 10, further comprising one or more additives comprising a thermal stabilizer, a hydrolysis stabilizer, a nucleating agent, a metal deactivator, a flame retardant additive, or a combination comprising at least one of the foregoing.

Embodiment 12

The article of any one or more of embodiments 1 to 11, wherein the thermoplastic composition has a siloxane content of 1 to 25 percent by weight, based on the combined weight of the polymer components.

Embodiment 13

The article of any one or more of embodiments 1 to 12, wherein the conductor wire comprises copper, aluminum, lead, gold, silver, iron, nickel, chromium, and alloys comprising at least one of the foregoing.

Embodiment 14

The article of any one or more of embodiments 1 to 13, wherein the covering has a thickness of 0.1 to 1 millimeters.

Embodiment 15

The article of any one or more of embodiments 1 to 14, wherein the electrical wire further comprises an intervening layer between the conductor wire and the covering.

Embodiment 16

The article of any one or more of embodiments 1 to 15, wherein the article is a construction component, a building component, an electrical device component, a railway vehicle component, an automobile component, a marine vehicle component, an aircraft component, or a data transmission component.

In general, the compositions and articles can alternatively comprise, consist of, or consist essentially of, any appropriate components herein disclosed. The compositions, methods and articles can additionally, or alternatively, be formulated so as to be devoid, or substantially free, of any components, materials, ingredients, adjuvants, steps, or species used in the prior art compositions or methods that are otherwise not necessary to the achievement of the function or objectives of the present invention.

All ranges disclosed herein are inclusive of the endpoints, and the endpoints are independently combinable with each other. "Combination" is inclusive of blends, mixtures, alloys, reaction products, and the like. "Or" means "and/or." Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. It is to be understood that the described elements may be combined in any suitable manner in the various embodiments.

As used herein, the term "hydrocarbyl" includes groups containing carbon, hydrogen, and optionally one or more heteroatoms (e.g., 1, 2, 3, or 4 atoms such as halogen, O, N, S, P, or Si). "Alkyl" means a branched or straight chain, saturated, monovalent hydrocarbon group, e.g., methyl, ethyl, i-propyl, and n-butyl. "Alkylene" means a straight or branched chain, saturated, divalent hydrocarbon group (e.g., methylene ($-CH_2-$) or propylene ($-(CH_2)_3-$)). "Alkenyl" and "alkenylene" mean a monovalent or divalent, respectively, straight or branched chain hydrocarbon group having at least one carbon-carbon double bond (e.g., ethenyl ($-HC=CH_2$) or propenylene ($-HC(CH_3)=CH_2-$). "Alkynyl" means a straight or branched chain, monovalent hydrocarbon group having at least one carbon-carbon triple bond (e.g., ethynyl). "Alkoxy" means an alkyl group linked via an oxygen (i.e., alkyl-O—), for example methoxy, ethoxy, and sec-butyloxy. "Cycloalkyl" and "cycloalkylene" mean a monovalent and divalent cyclic hydrocarbon group, respectively, $-C_nH_{2n-x}$ and $-C_nH_{2n-2x}-$ wherein x is the number of cyclization(s). "Aryl" means a monovalent, monocyclic or polycyclic aromatic group (e.g., phenyl or naphthyl). "Arylene" means a divalent, monocyclic or polycyclic aromatic group (e.g., phenylene or naphthylene). The prefix "halo" means a group or compound including one more halogen (F, Cl, Br, or I) substituents, which can be the same or different. The prefix "hetero" means a group or compound that includes at least one ring member that is a heteroatom (e.g., 1, 2, or 3 heteroatoms, wherein each heteroatom is independently N, O, S, or P. "Substituted" means that the compound or group is substituted with at least one (e.g., 1, 2, 3, or 4) substituents instead of hydrogen, where each substituent is independently nitro ($-NO_2$), cyano ($-CN$), hydroxy ($-OH$), halogen, thiol ($-SH$), thiocyano ($-SCN$), $C_{1-6}$ alkyl, $C_{2-6}$ alkenyl, $C_{2-6}$ alkynyl, $C_{1-6}$ haloalkyl, $C_{1-9}$ alkoxy, $C_{1-6}$ haloalkoxy, $C_{3-12}$ cycloalkyl, $C_{5-18}$ cycloalkenyl, $C_{6-12}$ aryl, $C_{7-13}$ arylalkylene (e.g., benzyl), $C_{7-12}$ alkylarylene (e.g., toluyl), $C_{4-12}$ heterocycloalkyl, $C_{3-12}$ heteroaryl, $C_{1-6}$ alkyl sulfonyl ($-S(=O)_2$-alkyl), $C_{6-12}$ arylsulfonyl ($-S(=O)_2$-aryl), or tosyl ($CH_3C_6H_4SO_2-$), provided that the substituted atom's normal valence is not exceeded, and that the substitution does not significantly adversely affect the manufacture, stability, or desired use of the compound. When a compound is substituted, the indicated number of carbon atoms is the total number of carbon atoms in the group, including those of the substituent(s).

All cited patents, patent applications, and other references are incorporated herein by reference in their entirety. While particular embodiments have been described, equivalents that are or may be presently unforeseen may arise to applicants or others skilled in the art. Accordingly, the appended claims as filed and as they may be amended are intended to embrace all such equivalents.

What is claimed is:

1. An article comprising an electrical wire, wherein the electrical wire comprises a conductor wire; and a covering disposed over the conductor wire, wherein the covering is formed from a thermoplastic composition comprising,
   5-75 weight percent aromatic polyketone; and
   25-95 weight percent poly(etherimide-siloxane) copolymer having a siloxane content of more than 0 to less than 50 weight percent based on the total weight of the poly(etherimide-siloxane) copolymer;
   wherein all weight percents are based on the total weight of the composition; and
   wherein the thermoplastic composition coating the conductor wire has one or more of the following properties:
   a tensile stress of greater than 30 MPa, determined according to UL-1581 after 24 hours at 23° C.;
   a tensile elongation of greater than 100%, determined according to UL-1581 after 24 hours at 23° C.; and
   achieves a pass rating in the single wire vertical flame propagation test conducted according to EN50265-2-1/IEC60332-1, as determined in the presence of the wire conductor,
   wherein the electrical wire has:
   a tensile stress of greater than 30 MPa, determined according to UL-1581 after heat aging for 168 hours at 178° C.; and
   a tensile elongation of greater than 50%, determined according to UL-1581 after heat aging for 168 hours at 178° C.

2. The article of claim 1, wherein the electrical wire achieves a pass rating in the single wire burn test conducted according to UL-1581 VW1.

3. The article of claim 1, wherein the electrical wire has a tear strength of greater than 25 N/mm, determined according to ISO 34-1.

4. The article of claim 1, wherein the poly(etherimide-siloxane) copolymer is a block copolymer having a siloxane content of 5 to 50 weight percent, based on the total weight of the block copolymer, and comprises repeating units of the formula

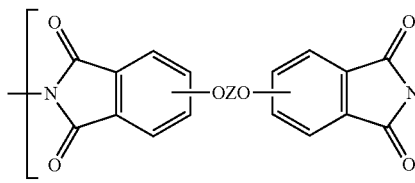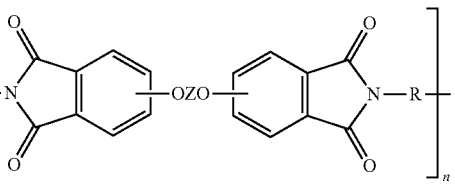

wherein
Z is a residue of bisphenol A,
$R^4$ is n-propylene,
E is 2 to 50,
n is 5 to 100, and
each R' is methyl.

5. The article of claim 1, wherein the aromatic polyketone comprises polyetherketone, polyetheretherketone, polyetherketone, polyarylketherketone, or a combination comprising at least one of the foregoing.

6. The article of claim 1, wherein the aromatic polyketone comprises polyetheretherketone.

7. The article of claim 1, wherein the thermoplastic composition comprises 40 to 60 weight percent of polyetheretherketone.

8. The article of claim 1, wherein the thermoplastic composition achieves a V0 rating at a thickness of 1.0 mm and 1.6 mm according to UL94 Vx.

9. The article of claim 1, wherein the thermoplastic composition has an ITC value of less than or equal to 15, as determined according to EN50305.

10. The article of claim 1, further comprising one or more additives comprising a thermal stabilizer, a hydrolysis stabilizer, a nucleating agent, a metal deactivator, a flame retardant additive, or a combination comprising at least one of the foregoing.

11. The article of claim 1, wherein the thermoplastic composition has a siloxane content of 1 to 25 percent by weight, based on the combined weight of the polymer components.

12. The article of claim 1, wherein the conductor wire comprises copper, aluminum, lead, gold, silver, iron, nickel, chromium, and alloys comprising at least one of the foregoing.

13. The article of claim 1, wherein the covering has a thickness of 0.1 to 1 millimeters.

14. The article of claim 1, wherein the electrical wire further comprises an intervening layer between the conductor wire and the covering.

15. The article of claim 1, wherein the article is a construction component, a building component, an electrical device component, a railway vehicle component, an automobile component, a marine vehicle component, an aircraft component, or a data transmission component.

* * * * *